Nov. 5, 1957  V. M. MATHEWS, JR., ET AL  2,811,765
MANUALLY MANIPULABLE INTERLOCKING MECHANISM
Filed Aug. 23, 1954
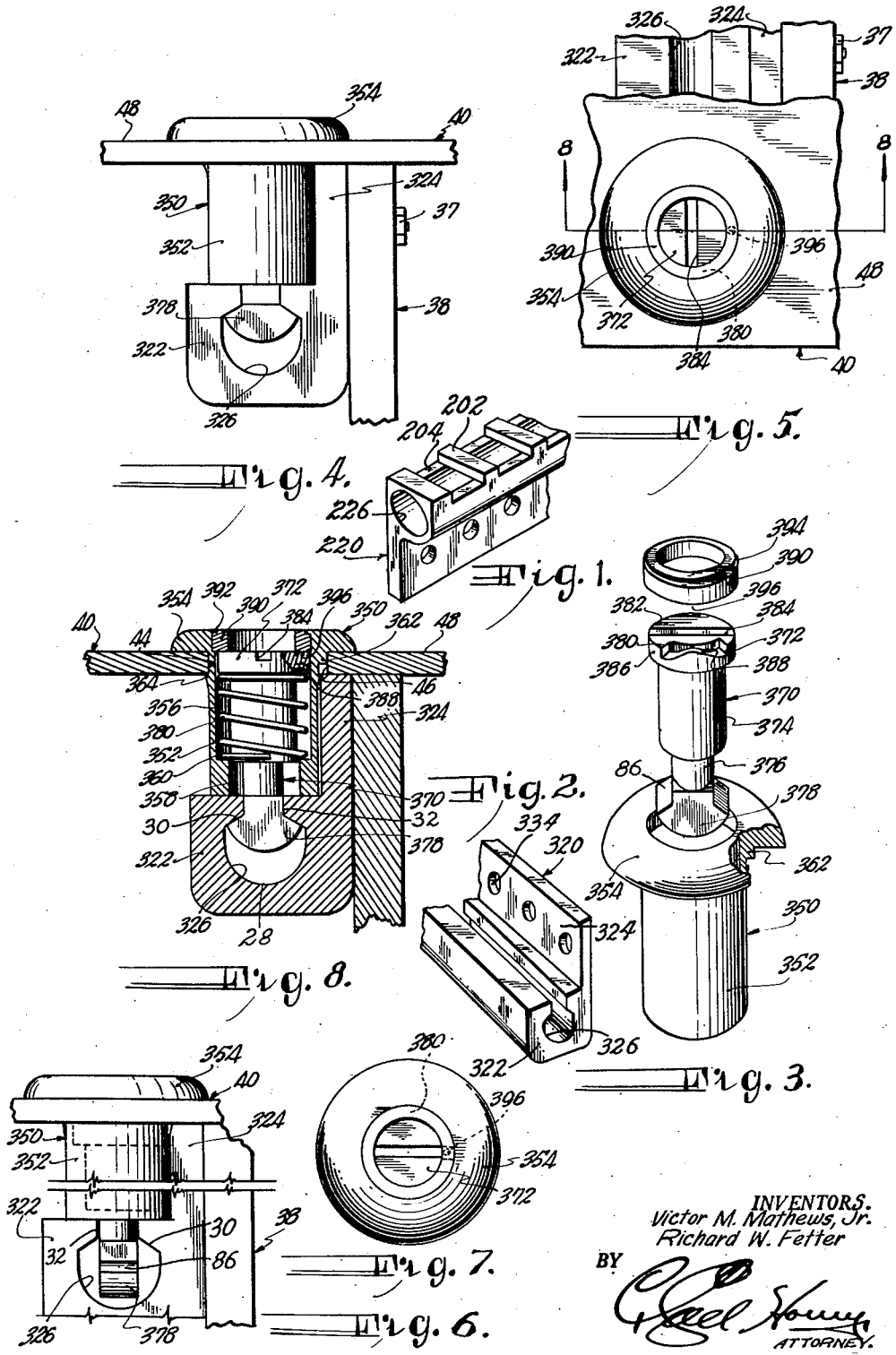
INVENTORS.
Victor M. Mathews, Jr.
Richard W. Fetter
BY
ATTORNEY.

United States Patent Office 2,811,765
Patented Nov. 5, 1957

2,811,765

MANUALLY MANIPULABLE INTERLOCKING MECHANISM

Victor M. Mathews, Jr., Kansas City, and Richard W. Fetter, Overland Park, Kans., assignors to Aermotive Equipment Corporation, Kansas City, Mo., a corporation of Delaware Application August 23, 1954, Serial No. 451,626

3 Claims. (Cl. 24—221)

This invention relates to the field of interlocking, fastening mechanisms and, more particularly, to such structure for providing releasable fastening means for holding a panel or the like upon a frame assembly.

It is the principal object of this invention to provide such releasable, interlocking, fastening means which are adapted for the rapid and convenient emplacement and removal of a panel or the like upon a frame and for the positive holding of the former upon the latter while in place.

It is another important object of the invention to provide such structure of increased versatility as to application, of improved construction and simplicity as to manufacture and installation, and of improved characteristics as to strength, space requirements, positiveness of holding action and adaptability for convenient operation by means of a single, commonplace tool such as a screwdriver.

Other important objects of the invention, including important details of construction, will be made clear or become apparent as the following specification progresses, reference being had to the accompanying drawings wherein:

Fig. 1 is a fragmentary, perspective view of one form of rail forming a part of the invention;

Fig. 2 is a fragmentary, perspective view of a modified form of rail;

Fig. 3 is an exploded, perspective view, with parts broken away and shown in section for clarity, of one form of mounting cup and holding stud assembly adapted to be used with one of the rails above;

Fig. 4 is an elevational view of the cup and stud assembly of Fig. 3 being used in conjunction with the rail of Fig. 2;

Fig. 5 is a top plan view of the cup and stud assembly shown in Fig. 4 illustrating the position of the stud when in its holding relationship to the rail;

Fig. 6 is an elevational view similar to that of Fig. 4, but illustrating the stud in position for insertion into or release from the rail;

Fig. 7 is a top plan view of the cup and stud assembly of Fig. 4 illustrating the position of the stud when in its released relationship relative to the rail; and Fig. 8 is a cross-sectional view taken upon line 8—8 of Fig. 5.

In Figs. 1 to 8 inclusive there is illustrated the preferred embodiment of the invention wherein the existence of protrusions from the outer face 48 of panel 40 is completely avoided. In this embodiment of the invention a rail 320 having a flange portion 324 provided with perforations 334 is adapted for securement to the frame piece 38 by any suitable fastening means 37 passing through perforations 334 and other perforations (not shown) in frame piece 38. Rail 320 has a laterally extending portion 322 in which is formed an elongated groove 326 having the cross-sectional configuration best illustrated in Figs. 4, 6 and 8. As is clear from the drawings, such groove 26 is rounded adjacent its innermost extremity 28, and has a pair of opposed inclined shoulders 30 generally facing the innermost extremity 28, and has a pair of spaced, substantially parallel walls 32 defining its outermost extremity for permitting ingress or egress into groove 26 of parts hereinafter to be described. It may be noted that rail 320 differs from rail 220 principally only in the facing of the groove 326 relative to the flange portion 324.

The cup and stud assembly of the invention includes a cup generally designated 350, a stud generally designated 370 and a coil spring 380, it being noted that the spring 380 is shown only in Fig. 8 and has been omitted from Fig. 3 for clarity of illustration.

Cup 350 includes a cylindrical sleeve 352 having an outturned flange 354 on one end thereof. A bore 356 passes through sleeve 352 and flange 354 and is of reduced diameter as at 358 adjacent the end of cup 350 remote from flange 354 to present an annular shoulder 360 within cup 350 facing the flanged end of the latter. Sleeve 352 is adapted to fit through the perforation 44 of panel 40 until flange 354 is in engagement with face 48 of panel 40, it being noted that an outward protrusion 362 formed on sleeve 352 in any suitable manner adjacent flange 354 thereof fits within notch 46 of opening 44 to prevent rotation of cup 350 relative to panel 40. The cup 350 may be preformed with a number of circumferentially spaced, outturned pips 364 spaced from flange 354 a distance such as to just underlie the panel 40 for holding cup 350 within opening 44. Alternately, pips 364 may conveniently be formed after cup 350 is in place within panel 40 by an appropriate punching action with any suitable tool upon the external surface of sleeve 352 adjacent panel 40.

Stud 370 includes a head 372 having a tool-receiving groove 384, an intermediate cylindrical portion 374 adjacent head 372, an extension portion 376 extending axially from portion 374, and a key 378 adapted to pass between walls 32 of groove 26 in rail 320 when the stud is disposed in one condition of rotation. Key 378 is provided with a pair of spaced inclined faces 86 facing head 372 of stud 370 and adapted to engage inclined shoulders 30 of groove 26 in rail 320 when the key 78 is within the groove 26. Head 372 is cut away as at 380 at the zone of juncture between its top face 382 and its circumferential face 386 to present a humped, arcuate surface 388 facing oppositely to key 378.

As best shown in Fig. 8, cup 350 is adapted to receive stud 370 therein with spring 380 bearing at one end thereof against shoulders 360 of sleeve 352 and at the opposite end thereof against head 372 of stud 370. Stud 370 is retained within cup 350 by an annular retaining washer or ring 390 through which a screwdriver or other tool is adapted to pass. Retaining ring 390 is in turn held within cup 350 by inturned pips 392 formed on flange 354 of cup 350 after the stud 370, spring 380 and ring 390 are in place, it being noted that ring 390 is preferably grooved as at 394 in order that pips 392 may tightly engage ring 390 to prevent any possibility of rotation thereof. A detent 396 depends from ring 390 and is adapted to ride upon cam surface 388 presented by cut away portion 380 of head 372. It will be apparent that detent 396 operates upon cam surface 388 to reciprocate stud 370 in the direction of key 378 during rotation of stud 370 by a screwdriver or the like engaged with tool-receiving groove 384. It will also be clear that when detent 396 is in its extreme positions relative to cam surface 388 the stud 370 is permitted to move in the direction of head 372 under the influence of spring 380. Thus, Figs. 6 and 7 indicate the disposition of parts when stud 370 is rotated to its one extreme position disposing detent 396 at one end of cam surface 388, so that key 378 is turned for insertion or removal from groove 326 of rail 320, it being understood that stud 370 is depressed against the action of spring 380 during insertion or removal by force applied through the tool-engaging head 372. As stud 370 is rotated toward its other extreme position the engagement of detent 396 with the hump of cam surface 388 assures that key 378 will be sufficiently depressed to avoid engagement between key 378 and the walls of groove 326. As such rotation is continued and stud 370 reaches such other extreme rotated position the deeper contour of cam surface 388 permits spring 380 to reciprocate stud 370 in a direction pulling key 378 into tight holding engagement with the walls of groove 326 of rail 320 as illustrated in Figs. 4 and 5.

It will now be apparent that the construction of Figs. 1 to 8 inclusive provides positive holding action and great convenience as to emplacement and removal of the panel 40 from the frame member 38. Furthermore, the invention has the additional advantage that only the relatively thin structure of flange 354 protrudes from face 48 of panel 40 and, since it is unusually neat in appearance, this is not normally objectionable. In Fig. 1 is illustrated one form of rail broadly designated 220, which is provided with a groove 226 of substantially circular cross-section such as might be employed with a stud 370 wherein the key 378 is formed so as to present a circular configuration. Rail 220 is also provided with a plurality of spaced cross bars 202 extending laterally across the open side of groove 226 at predetermined intervals along the length of the rail 220. It will be understood that such cross bars 202 could also be provided on the rail 220, if desired. The purpose of such cross bars 202 is to further assure against any possibility of sliding action of the keys 378 longitudinally of the rail 220 although the same are not required in normal applications, where extreme weights or forces are to be encountered, such construction has been found advantageous. It may be noted that, in the manufacture of the rail 220, the same may be initially formed with the circular groove 226 therein, and spaced portions of the rail 220 may then be conveniently milled away as at 204 to present the finished construction illustrated in Fig. 1.

It will be manifest to those skilled in the art that many minor modifications and changes could be made from the exact structural details described for purposes of illustration without departing from the true spirit and intention of this invention. Accordingly, it is to be understood that we desire to be limited only by the scope of the appended claims.

Having thus described the invention, what is claimed as new and desired to be secured by Letters Patent is:

1. Mechanism for releasably interlocking a panel or the like having an opening therein to a frame piece or the like, said mechanism comprising an elongated rail of substantially L-shaped cross-section having a flange portion and a laterally extending portion, the latter being provided with a longitudinal groove opening in the direction of said flange portion and having an internal shoulder facing in the opposite direction; means adapted for securing said rail to the frame piece; an open-ended cup assembly secured within said opening of the panel and extending from the latter primarily in said opposite direction toward said laterally extending portion of the rail alongside said flange portion of the latter; a stud rotatably and reciprocably mounted within the cup assembly and including a portion extending beyond the latter in said opposite direction; a key upon the last mentioned portion of the stud, said key being adapted to be inserted in said groove when the stud is in one position of rotation and reciprocation relative to the rail and to be held within said groove with a surface thereof in abutment with said shoulder when the stud is in a second position of rotation and reciprocation relative to the rail; and means yieldably biasing the stud in said first mentioned direction toward said second position.

2. In the mechanism as set forth in claim 1, wherein is provided stop means for limiting rotation of the stud to that part of a revolution bounded by said positions, said part constituting substantially one quadrant of a complete revolution.

3. In the mechanism as set forth in claim 2, wherein a portion of the stud is cut away to present a humped cam surface, and said cup assembly includes fixed detent means in engagement with said cam surface for automatically reciprocating the stud in said opposite direction as it is rotated from either of said positions toward the other and for automatically reciprocating the stud in said first mentioned direction as said other position is approached.

References Cited in the file of this patent

UNITED STATES PATENTS

| | | |
|---|---|---|
| 167,624 | Share | Sept. 14, 1875 |
| 948,119 | Wettig | Feb. 1, 1910 |
| 1,454,251 | Powell | May 8, 1923 |
| 2,187,426 | Kuhnel | Jan. 16, 1940 |
| 2,235,949 | Shaw | Mar. 25, 1941 |
| 2,580,666 | Dzus | Jan. 1, 1952 |
| 2,601,213 | Poupitch | June 17, 1952 |